United States Patent [19]

Creemers

[11] 3,944,529

[45] Mar. 16, 1976

[54] PROCESS FOR THE PREPARATION OF POLYBUTENE-1

[75] Inventor: Henricus M. J. C. Creemers, Geleen, Netherlands

[73] Assignee: Stamicarbon, B.V., Geleen, Netherlands

[22] Filed: May 8, 1973

[21] Appl. No.: 358,415

[30] Foreign Application Priority Data

May 10, 1972 Netherlands.................... 7206290

[52] U.S. Cl....... 260/88.2 R; 260/88.2 B; 260/93.7; 260/94.8; 260/94.9 B; 260/94.9 C
[51] Int. Cl.$^2$..............C08F 210/00; C08F 212/00; C08F 110/00; C08F 110/02
[58] Field of Search ..... 260/94.9 B, 94.9 C, 88.2 R, 260/88.2 B, 93.7, 94.8

[56] References Cited
UNITED STATES PATENTS 3,225,021  12/1965  Erchak, Jr. ..................... 260/93.7
3,309,350  3/1967  Kelley et al. ..................... 260/88.2 B Primary Examiner—Joseph L. Schofer
Assistant Examiner—Herbert J. Lilling
Attorney, Agent, or Firm—Cushman, Darby & Cushman

[57] ABSTRACT

A process for suspension polymerizing butene-1 with 0 to about 20 mol % of at least one other α-alkene of 2 to 10 carbon atoms is disclosed, wherein the monomers are polymerized in the presence of a Ziegler coordination catalyst using isobutane as the polymerization solvent. The polymerization reaction is effected at a temperature of 20°–70°C. The product polybutene is obtained in the form of a suspension which is easily handled and which has high isotactic polybutene content.

8 Claims, No Drawings

PROCESS FOR THE PREPARATION OF POLYBUTENE-1

BACKGROUND OF THE INVENTION

The present invention relates to the production of butene-1 homopolymers and copolymers with minor amounts of one or more other α-alkenes in a liquid inert distributing agent or solvent in the presence of Ziegler coordination catalysts.

Ziegler coordination catalysts for the polymerization of α-alkenes are well known to those in the art, and are typically based upon one or more compounds of metals of groups IV B, V B, VI B of the Periodic table, and one or more organometallic compounds of metals of group I, II, or III of the Periodic table. Many variations of the Ziegler coordination catalysts are known, including, for instance, supported catalysts, catalysts systems which contain additional compounds such as, for instance, Lewis bases and other compounds. All of the known polymerization catalysts of this type may be used in the present process.

The polymerization of butene-1 in the presence of Ziegler coordination catalysts yields both isotactic polybutene-1 and atactic polybutene-1. It is generally desired to obtain polymers having the highest possible isotactic polymer content, and therefore the catalyst composition will generally be chosen so that a high content of isotactic material in the product polybutene-1 is obtained. For instance, a violet titanium trichloride and diethylaluminum chloride are commonly used. The isotactic polybutene-1 is insoluble or only slightly soluble at temperatures below about 45°C in the reaction solvent commonly used for such polymerizations. As known in the art, the reaction solvent is an inert distributing agent or solvent such as pentane, hexane, heptane, gasoline, kerosene and even liquid monomer. Normally, the polymerization in liquid monomeric butene-1 is conducted under superatmospheric pressure.

As noted above, isotactic polybutene-1 is at most only slightly soluble in the conventional reaction solvent at temperatures below about 45°C. The polymerization of butene-1 at temperatures below 45°C or so will normally yield directly a suspension of polybutene which, depending upon the particular reaction temperature chosen, is swollen to various degrees. Because of the effect on polymerization rate, the polymerization temperature is normally chosen as high as possible and thus suspension polymerization reactions are normally conducted at temperatures of about 40°–45°C. As such elevated suspension polymerization temperatures, however, quite swollen, sometimes even jelly-like, polybutene-1 polymers are obtained, and these polymers are most difficult to handle. To overcome some of the problems which are encountered if suspensions of swollen polymers are processed, or further worked up, special types of stirred reactors have been proposed in German patent application No. 1,910,482 (open for public inspection).

If polymerization is conducted at temperatures in excess of 45°C, such as, for instance, 60° to 80°C, a solution of the polybutene-1 is normally obtained. The polybutene polymer can be isolated from the solution, generally and most suitably by solvent evaporation. If the polybutene-1 solution is cooled to temperatures below about 45°C, a gelatinous mass is obtained which cannot be further processed, or which can be further processed only with great difficulty, and there is therefore no suitable method of isolating the polybutene-1 from the polymerization solution without solvent evaporation. In order for the desired polymerization rates to be obtained, polymerization temperatures of at least 50°C and preferably at least 60°C are normally considered necessary. For this reason, butene-1 is normally polymerized using solution polymerization techniques.

SUMMARY OF THE INVENTION

The present invention is directed towards a process for suspension polymerizing butene-1, optionally with minor amounts of one or more other α-alkenes of up to 10 carbon atoms using a Ziegler coordination catalyst system. The inert polymerization solvent is isobutane and the polymerization is conducted at a temperature of about 20°C to about 70°C. The resulting polymers are at most only slightly swollen, and the suspension of the polymers may be worked up in a relatively simple way.

DESCRIPTION OF THE INVENTION

Suspensions of polybutene-1 which are substantially unswollen and which can be worked up using simple procedures can be obtained by suspension polymerizing butene-1 at temperatures of 20°–70°C, preferably at temperatures of over 40°C, using isobutane as the reaction suspension agent or distributing agent. Isobutane boils at −10°C at atmospheric pressure, and this low boiling point makes it necessary to conduct the polymerization under pressure, generally about autogenic pressure. The polymerization may be conducted at various temperatures, within the above noted ranges. Generally, it is desired to conduct the polymerization at temperatures above 20°C, as the polymerization rate decreases with lower temperatures. Polymerization temperatures over 70°C or so are undesirable because the isotactic polybutene content will decrease at higher polymerization temperatures, with an increase in the atactic polybutene content. Thus the yield of isotactic polybutene-1, based upon the amount of starting butene-1, decreases fairly rapidly.

The polybutene-1 does not dissolve in the isobutane at temperatures of over 40°–50°C, and a substantially unswollen polymer powder that is very easy to handle is directly obtained at polymerization temperatures of 50°C. It is preferred that the butene-1 is polymerized according to the present process at temperatures of 50°–70°C, most preferably at temperatures of 60°–70°C.

Various process techniques known to the art for the polymerization of α-alkenes may be used in the process of the present invention. For instance, the polymerization may be conducted in the presence of small amounts hydrogen to control the molecular weight of the resulting polymer. The polymer isolation and catalyst deactivation and, if required, the removal of the catalyst by washing may be conducted according to conventional techniques. Polymerization may be conducted in a continuous or discontinuous manner in one or more stages.

The process of the present invention may be used to prepare homopolymers of butene-1 and copolymers of butene-1 with minor amounts of other α-alkenes. When the comonomer is ethylene and/or propylene, amounts of up to 20 mol % may be included in the copolymer. When the comonomer is a higher alkene, such as pentene-1, or hexene-1, generally no more than about 8 mol % will be included in the copolymer.

It is preferred that the process of the present invention be conducted so that the concentration of polymer in the suspension does not become unduly high, as otherwise the suspension will become too thick and difficult to stir and/or process. In general, therefore, an amount of isobutane will be used such that the polybutene-1 concentration in the suspension is less than 30% by weight, more preferably less than 20% by weight. Low concentrations are quite easy to process but uneconomic because of the large amounts of isobutane that are then required. Therefore, the polymerization is most preferably conducted in such a way that the concentration of the polybutene-1 in the suspension at the conclusion of the polymerization reaction is about 15–20% by weight.

The transition metal compound is preferably a trivalent or tetravalent titanium compound, although other transition metal compounds of metals of groups of IV-B, V-B, and VI-B of the Periodic system may be utilized. As known to the art (note e.g., Ziegler U.S. Pat. No. 3,070,549, the disclosure of which is hereby incorporated by reference) any compound of the metals, such as the halogenides, oxyhalogenides, complex halogenides, freshly precipitated oxides or hydroxides of organic compounds such as alcholates, mixed alcoholates, acetates, benzoates, acetyl acetonates, and similar compounds, including mixtures, may be used. Specific examples of such compounds of other transition metals include $VCl_4$, $VOCl_3$, $MoCl_5$, $ZrCl_4$ and chromium acetylacetonate.

The titanium compound or other transition metal compound is generally of the formulae:

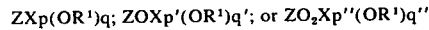

$ZX_p(OR^1)_q$; $ZOXp'(OR^1)q'$; or $ZO_2Xp''(OR^1)q''$ wherein Z is at least 1 transition metal of groups IV-B, V-B, and Vi-B of the Mendeleef Periodic Table of Elements, X is chlorine or bromine, $R^1$ is selected from the group consisting of alkyl and cycloalkyl groups containing from 1 to 12, preferably from 1 to 4, carbon atoms, $p$ and $q$ represent values from 0 to 4 with the sum of $p$ and $q$ being 3 or 4; $p'$ and $q'$ represent values from 0 to 3 with the sum of $p'$ and $q'$ being 3; and $p''$ and $q''$ represent values from 0 to 2 with the sum of $p''$ and $q''$ being 2. Preferably, the transition metal compound will consist substantially, i.e., at least 80 mole percent, of at least one titanium compound. The titanium compound used is preferably a halide, particularly a chloride, of trivalent or tetravalent titanium or a compound which has been derived therefrom by replacing one or more halogen atoms by an alkoxy group, such as tetrabutoxytitanium, diethoxytitanium dibromide, dibutoxytitanium dichloride and monoethyoxytitanium trichloride. Of said alkoxy compound the tetraalkoxytitanates, and more in particular tetrabutoxytitanate, are preferred.

The organo metallic compounds of metals of the groups I through III of the Periodic system generally have the formulae:

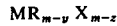

$MR_{m-y}X_{m-z}$ wherein M is a metal of groups I, II or III of the Periodic system, R is selected from the group consisting of alkyl, cycloalkyl, aralkyl aryl of alkaryl radicals of 1 to 20 carbon atoms, X is a halogen atom, $m$ is the valence of M, $y$ is a value from 0 to 1 less than $m$, and $z$ is a value from $m$ to 1. The organometallic compound of the metal of groups I–III of the Periodic system is preferably an organo aluminum compound, such as an organo aluminum halide. The organo aluminum halide contains 1 or 2 halogen atoms per aluminum atom and at least 1 hydrocarbon radical with a carbon atom directly linked to the aluminum atom. Examples of preferred aluminum compounds are diethylaluminum chloride, diisobutylaluminum chloride, diisobutylaluminum bromide, aluminumethyl sesquichloride.

A major advantage of the present invention is that the suspension polymerization in isobutane can be conducted at polymerization temperatures in excess of 45 °C, which results in polymerization rates which are comparable or of the same order of magnitude as those obtained in solution polymerization. An additional advantage of the suspension polymerization process of the present invention is that the isotacticity of the suspended polybutene-1 is increased by the relative solubility of the atactic polybutene-1 in the isobutane.

EXAMPLES OF THE INVENTION

The present invention will be understood more clearly by reference to the following examples, which are intended to illustrate and not to limit the scope of the invention.

EXAMPLE 1

900 grams of isobutane and 2.5 ml of a 2-molar solution of diethyl aluminum chloride in gasoline and 1 ml of a 1-molar suspension of $\delta$-$TiCl_3$ in gasoline are successively fed to a 2.5-litre autoclave provided with a stirrer. The $\delta$-$TiCl_3$ was prepared according to Dutch Patent Specification No. 111,634. Thereafter, 350 grams of butene-1 were passed into the reactor and heated at 50 °C at autogenous pressure. After 2 hours of polymerization, a suspension of polybutene-1 was obtained. The polybutene was separated from the isobutane and the remaining, unreacted butene by with a yield of polybutene-1 of 92 grams. The isotactic polybutene-1 content in this polybutene was 99.1 percent, determined by extraction with diethyl ether for over 5 hours. The average particle size of the polymer was 120 $\mu$.

COMPARATIVE EXAMPLE A

Example 1 was repeated except the isobutane was replaced by 1,500 ml of gasoline. A solution of polybutene-1 and gasoline was obtained from which the polybutene was isolated by flash evaporation, resulting in the production of 101 grams of polybutene-1 with an isotactic content of 98 percent.

COMPARATIVE EXAMPLE B

Example 1 was repeated, except 900 grams of butene-1 were used as the distributing agent in place of the isobutane. A solution of polybutene-1 in liquid monomer was obtained, and the polybutene-1 was recovered by flash-evaporation. 141.5 grams of polybutene-1 having an isotactic content of 97.6 percent was obtained.

What is claimed is:

1. In a process for suspension polymerizing butene-1 with 0 to about 20 mole % of at least one other $\alpha$-alkene of up to 10 carbon atoms in the presence of a catalytic amount of a Ziegler coordination catalyst based upon at least one transition metal compound of a metal of groups IV B, V B and VI B and at least one organo-metallic compound of a metal of groups I, II, or III in an inert solvent, the improvement comprising using isobutane as the inert polymerization solvent and conducting the polymerization at a pressure such that the isobutane is a liquid at a temperature of about 50°C to about 70°C to obtain the butene-1 polymer in a substantially unswollen state.

2. Process according to claim 1 wherein the amount of isobutane in the system is such that the resulting polybutene-1 suspension contains at most 30% by weight of polybutene-1 polymer.

3. Process according to claim 2 wherein the resulting suspension contains about 15 to about 20% by weight of polybutene-1 polymer.

4. Process according to claim 1, wherein the polymerization is conducted at about autogenic pressure.

5. Process according to claim 1 wherein the polymerization temperature is 60° to 70°C.

6. Process according to claim 5 wherein said transition metal compound is a titanium compound.

7. Process according to claim 6 wherein the organometallic compound is an organo-aluminum compound.

8. Process according to claim 7 wherein the organo-aluminum compound is an organo-aluminum halide.

* * * * *

UNITED STATES PATENT OFFICE
CERTIFICATE OF CORRECTION

Patent No. 3,944,529　　　　　　　　Dated　March 16, 1976

Inventor(s) Henricus M. J. C. Creemers

It is certified that error appears in the above-identified patent and that said Letters Patent are hereby corrected as shown below:

At Column 3, line 37, please change "Vi-B" to --VI-B--.

Signed and Sealed this

Sixth Day of July 1976

[SEAL]

Attest:

RUTH C. MASON
Attesting Officer

C. MARSHALL DANN
Commissioner of Patents and Trademarks